(12) United States Patent
Holliday

(10) Patent No.: US 11,362,514 B1
(45) Date of Patent: Jun. 14, 2022

(54) TRANSIENT SURGE PROTECTION UNIT

(71) Applicant: Scott Hill Holliday, Sugar Land, TX (US)

(72) Inventor: Scott Hill Holliday, Sugar Land, TX (US)

(*) Notice: Subject to any disclaimer, the term of this patent is extended or adjusted under 35 U.S.C. 154(b) by 1342 days.

(21) Appl. No.: 15/439,747

(22) Filed: Feb. 22, 2017

Related U.S. Application Data

(60) Provisional application No. 62/299,753, filed on Feb. 25, 2016.

(51) Int. Cl.
*H02H 9/00* (2006.01)
*H02H 9/04* (2006.01)
*G08B 21/18* (2006.01)

(52) U.S. Cl.
CPC .......... *H02H 9/045* (2013.01); *G08B 21/185* (2013.01)

(58) Field of Classification Search
CPC .......... H02H 9/04; H02H 9/045; H02H 9/005; G08B 21/185
USPC .............................................. 361/56, 90, 111
See application file for complete search history.

(56) References Cited

U.S. PATENT DOCUMENTS

| | | | | |
|---|---|---|---|---|
| 3,559,451 A | * | 2/1971 | Hyer et al. ........... | G01G 11/006 73/1.13 |
| 5,271,526 A | * | 12/1993 | Williams ............... | B67D 7/744 137/624.13 |
| 2013/0301179 A1 | * | 11/2013 | Scott ...................... | H02H 9/005 361/111 |

* cited by examiner

*Primary Examiner* — Jared Fureman
*Assistant Examiner* — Lucy M Thomas
(74) *Attorney, Agent, or Firm* — Nolte Lackenbach Siegel

(57) ABSTRACT

A dual transient surge and communication protection device, which can have less than 5 nanosecond response time and can provide communication and power transient surge protection for field instrumentation and be configured for operating under multiple communication protocols. The dual transient surge and communication protection device can have a positive power and communication terminal, a negative power and communication terminal, a grounding terminal, a first silicon avalanche diode array, a second silicon avalanche diode array, a first non-polar wire, a second non-polar wire, a grounding wire and a unit viability wire. The device provides protection from 4 milliamps to 20 milliamps of power and communication signals for field instruments.

12 Claims, 4 Drawing Sheets

TRANSIENT SURGE PROTECTION UNIT

CROSS REFERENCE TO RELATED APPLICATIONS

The present application claims priority to and the benefit of U.S. Provisional Patent Application Ser. No. 62/299,753 filed on Feb. 25, 2016, entitled "TRANSIENT SURGE PROTECTION UNIT". This reference is hereby incorporated in its entirety.

FIELD

The present embodiment generally relates to a transient surge protection unit for field instrumentation.

BACKGROUND

A need exists for a transient surge protection unit with less than 5 nanosecond response time.

The present embodiments meet these needs.

BRIEF DESCRIPTION OF THE DRAWINGS

The detailed description will be better understood in conjunction with the accompanying drawings as follows.

Figure 1:
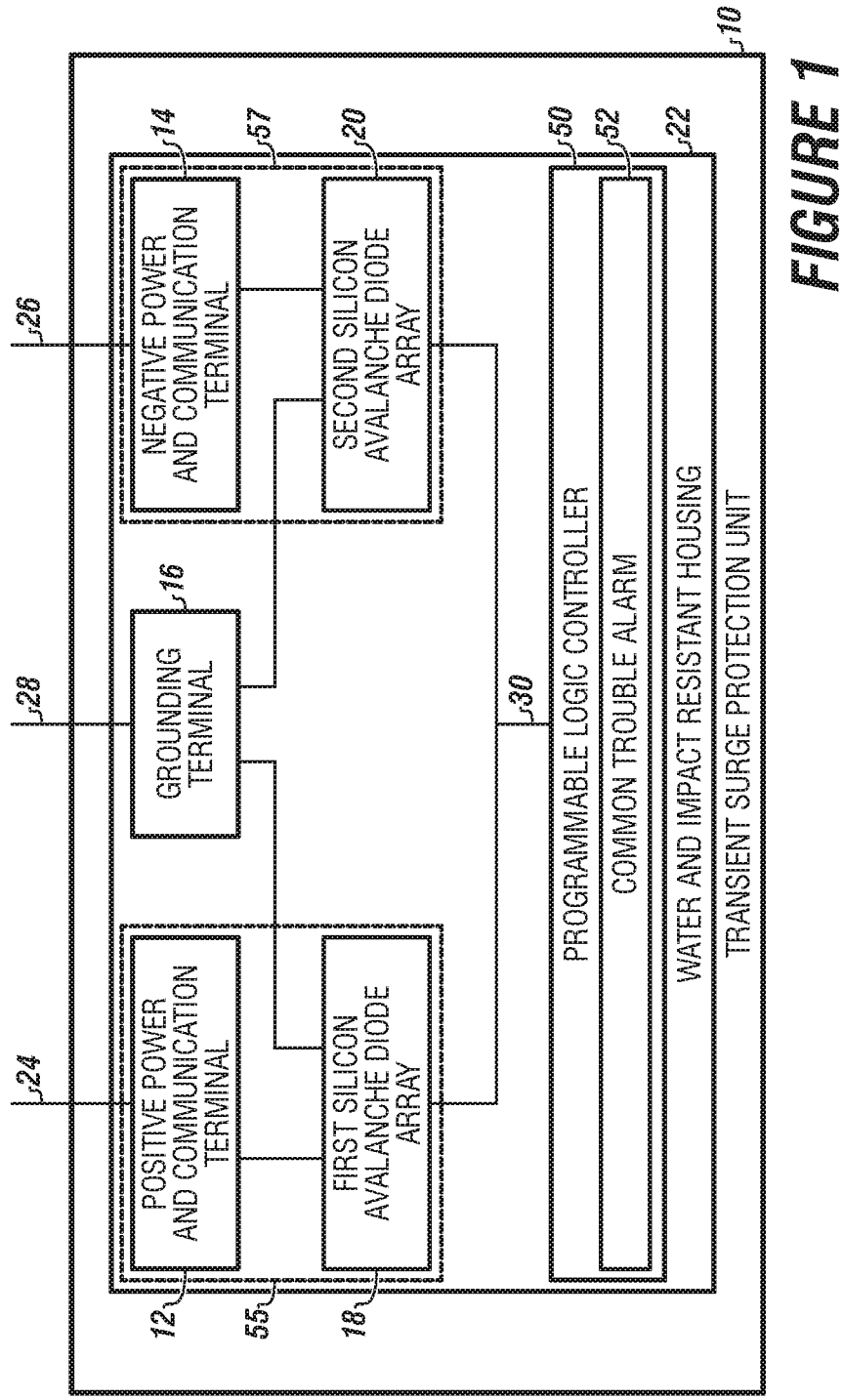
FIG. 1 depicts a diagram of a transient surge protection unit according to one or more embodiments.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The embodiments generally relate to a transient surge protection unit for field instrumentation.

The invention relates to a dual transient surge and communication protection device for field instrumentation.

The invention includes a dedicated loop of power and communication connected in parallel with at least one of: a dedicated loop of power; a dedicated loop of communication; and another dedicated loop of power and communication.

The invention uses a first silicon avalanche diode array configured for receiving power and communication from the dedicated loop of power and communication using multiple communication protocols, the first silicon avalanche diode array configured for transferring excess energy to ground via a common wire within less than 5 nanoseconds, when energy exceeds a preset limit.

The invention uses a second silicon avalanche diode array connected in parallel with the first silicon avalanche diode array for receiving at least one of: a dedicated loop of power; a dedicated loop of communication; and another dedicated loop of power and communication; using multiple communication protocols; the second silicon avalanche diode array configured for automatically transferring excess energy to ground via a common wire when energy exceeds a preset limit.

The invention includes a programmable logic controller configured to identify when at least one of the silicon avalanche diode arrays self-sacrifices producing a common trouble alarm and transmitting an alert to a network or local alarm system.

The dual transient surge and communication protection device provides an uninterrupted power and communication signal from 4 milliamps to 20 milliamps for field instruments.

The following terms are used herein:

The term "alert" refers to a signal from the programmable logic controller to a network produced by the common trouble alarm to notify a client device, such as a cell phone, of the failure of the system. The alert can also be transferred to a local alarm device for viewing by local operators.

The term "avalanche diode array" as used herein can refer to a diode, which can be made from silicon or other semiconductor, that is designed to experience avalanche breakdown at a specified reverse bias voltage. The junction of an avalanche diode array is designed to prevent current concentration and resulting hot spots, so that the diode array is undamaged by the breakdown. The avalanche diode array breakdown is due to minority carriers accelerated enough to create ionization in the crystal lattice, producing more carriers, which in turn create more ionization. Because the avalanche breakdown is uniform across the whole junction, the breakdown voltage is nearly constant with changing current compared to a non-avalanche diode array.

Avalanche diode arrays are optimized for avalanche effect so they exhibit small but significant voltage drop under breakdown conditions, unlike Zener diodes that always maintain a voltage higher than breakdown. This feature provides better surge protection than simple Zener diodes and acts more like a gas discharge tube replacement. Avalanche diode arrays have a small positive temperature coefficient of voltage, where diode arrays relying on the Zener effect have a negative temperature coefficient.

The term "common trouble alarm" as used herein for a programmable logic controller can refer to an alarm, which supervises the transient surge protection unit for open, short, or grounded circuit faults.

The term "communication" can refer signals such as RS 422/485, RS232, 4-20 MA.

The term "dedicated loop of power and communication" refers to the positive and negative power input, the positive and negative communication signal input to the silicon avalanche diode array.

The term "dedicated loop of power" refers to refers to the positive and negative power input, to the silicon avalanche diode array.

The term "dedicated loop of communication" refers to the positive and negative communication signal input to the silicon avalanche diode array.

The term "first silicon avalanche diode array" refers to two or more discrete silicon avalanche diodes (SAD) bonded together to work in conjunction to suppress excess energy. In accordance with some embodiments, arrays may include two or more stacks of silicon avalanche diodes, or multiple pairs of SAD arrays. An example of a stack of SAD can be three 16 volt (+/−5%) RoHS compliant silicon avalanche diodes that are cut from a silicon wafer.

The term "grounding wire" as used herein can refer to is a circuit conductor that can carry current in normal operation, which is connected to ground.

The term "grounding terminal" as used herein can refer to a terminal that provides a reference voltage level, which can also be called zero potential or ground potential, against which all other voltages in a system are established and measured to prevent hazardous voltages from appearing on equipment.

The term "local alarm system" refers to a device connected to the field instrument that provides a visual or audio notification of value.

The term "multiple communication protocols" as used herein can refer to at least a 4-20 Amp RS-485 or RS 232 communication protocols. The multiple communication protocols can also include heart protocols.

The term "negative communication only terminal" as used herein can refer to a terminal that is used for terminating the communications session.

The term "network" refers to a cellular network, a global communication network such as the internet, a satellite network, a local area network, a wide area network or combinations thereof.

The term "non-degrading" as used herein can refer to a material that provides power protection that does not degrade or weaken over time. In embodiments, the unit is non-degrading by being at 100 percent or at 0 percent.

The term "non-polar wire" as used herein can refer to wires that do not conduct electric current.

The term "positive communication only terminal" as used herein can refer to a terminal that is used for activating the communications session.

The term "positive power and communication terminal" as used herein can refer to a terminal that receives a combined power and communication signal at a frequency from 4 milliamps to 20 milliamps of DC power.

The term "programmable logic controllers" refers to a device receiving a signal input such as a digital input (DI) and producing a signal that can be transferred to a network or another monitoring device. The programmable logic controller can contain computer instructions to compare input signals to preset limits and trigger the transmissions of the common trouble alarm of embodiments described herein.

The term "negative power only terminal" as used herein can refer to a terminal that receives power at a frequency from −4 milliamps to −20 milliamps of DC power.

The term "negative power and communication terminal" as used herein can refer to a terminal that receives a combined power and communication signal at a frequency from −4 milliamps to −20 milliamps of DC power.

The term "positive power only terminal" as used herein can refer to a terminal that receives power at a frequency from 4 milliamps to 20 milliamps of DC power.

The term "power" as used herein refers to power ranging from 0.1 volts to 24 volts of DC power.

The term "response time" as used herein can refer to the unit seeing a power spike, and then responding to that power spike in a less than 5 nanosecond of time duration.

The term "self-sacrifices" refers to action performed by one of the silicon avalanche diode arrays that terminates power transfer, communication transfer, or both from the field instrument preventing field instrument failure.

The term "transient" as used herein can refer to voltage surges or spikes.

The term "unit viability wire" as used herein can refer to wire, which can connect the avalanche diode array to the programmable logic controller for indicating that the transient surge protection unit is operable or has self-sacrificed due to a power surge.

The term "water and impact resistant housing" as used herein can refer to a housing made of UV-stable polycarbonate and fiberglass.

Turning now to the Figures, FIG. 1 depicts a diagram of a transient surge protection unit according to one or more embodiments.

In embodiments, the transient surge protection unit can be non-degrading with a less than 5 nanosecond response time.

The transient surge protection unit can simultaneously provide communication and power transient surge protection system for field instrumentation with 4 milliamps to 20 milliamps.

The transient surge protection unit can simultaneously provide communication and power transient surge protection system for field instrumentation and be configured for operating under multiple communication protocols with a nanosecond response time.

The transient surge protection unit 10 can have a positive power and communication terminal 12, a negative power and communication terminal 14 and a grounding terminal 16.

The transient surge protection unit 10 can have a first silicon avalanche diode array 18, which can be connected to the grounding terminal 16 and the positive power and communication terminal 12 and a second silicon avalanche diode array 20, which can be connected to the grounding terminal 16 and the negative power and communication terminal 14.

The transient surge protection unit 10 can have a programmable logic controller 50 with a common trouble alarm 52, which can be connected to the first silicon avalanche diode array and the second silicon avalanche diode array. The programmable logic controller can have a unit viability wire 30 for indicating that the transient surge protection unit is operable or has self-sacrificed due to a power surge.

In embodiments, a water and impact resistant housing 22 can envelope the first silicon avalanche diode array 18, the second silicon avalanche diode array 20, and the programmable logic controller 50.

A first non-polar wire 24 can be connected to the positive power and communication terminal 12 and can extend from the water and impact resistant housing 22. A second non-polar wire 26 can be connected to the negative power and communication terminal 14 and can extend from the water and impact resistant housing 22.

A grounding wire 28 can be connected to the grounding terminal 16 and can extend from the water and impact resistant housing 22.

In embodiments, the transient surge protection unit 10 can simultaneously provide: a first dedicated loop of power 55 consisting of the positive power and communication terminal 12 with the first silicon avalanche diode array 18 and a second dedicated loop of communication 57 consisting of the negative power and communication terminal 14 with the second silicon avalanche diode array 20.

In this embodiment, the transient surge protection unit can provide protection from 4 milliamps to 20 milliamps of power and communication signals for field instruments.

It should be noted that the field instruments as referred to herein can be, but is not limited to: flow meters, flow computers, gas detection equipment, moisture and density instrumentation, gas chromatographs, valve control equipment, fluid or gas level instrumentation, pressure and sensor transducers.

Figure 2:
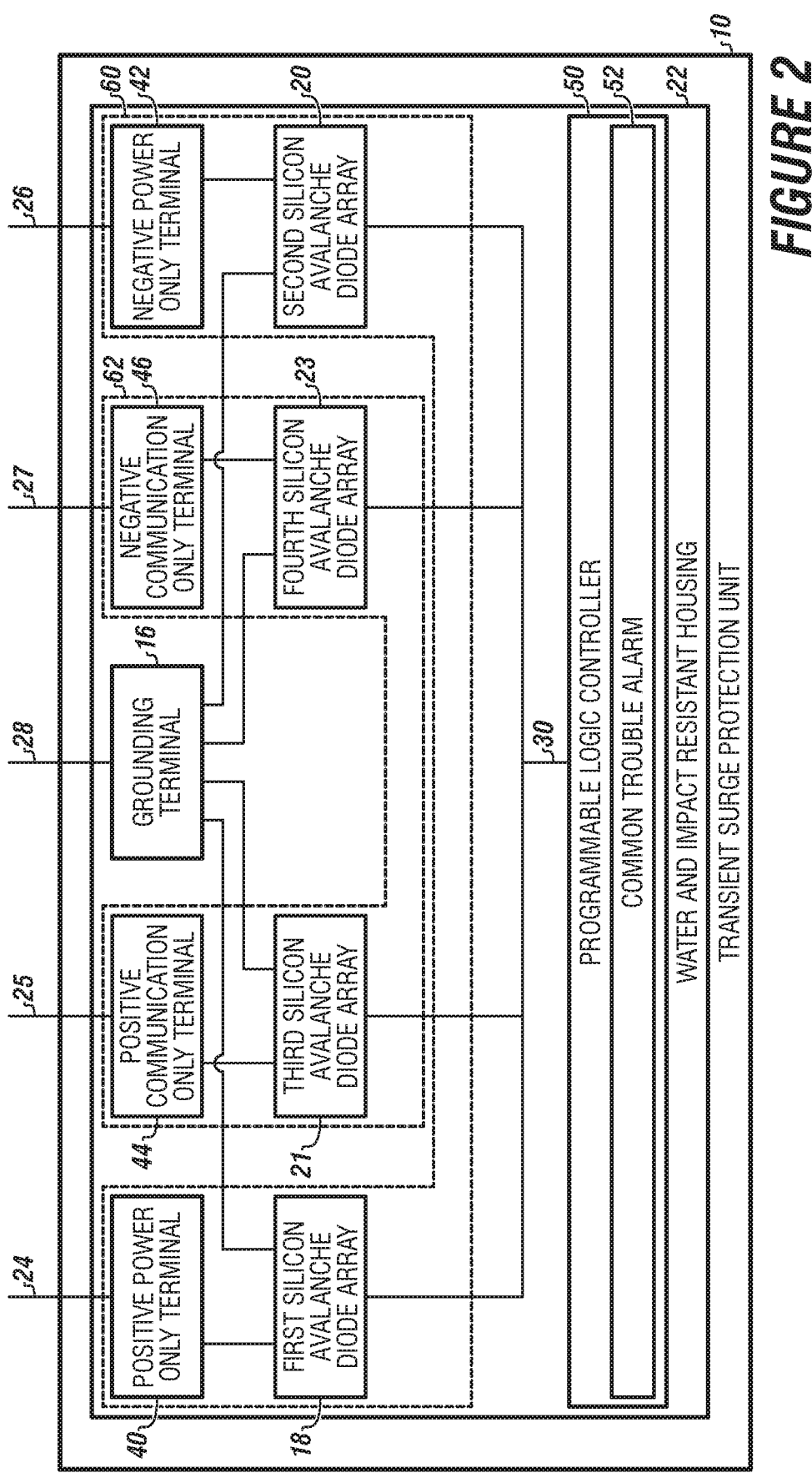
FIG. 2 depicts a diagram of a transient surge protection unit according to one or more embodiments.

FIG. 2 depicts a diagram of a transient surge protection unit according to one or more embodiments.

The transient surge protection unit 10 can include a first silicon avalanche diode array connecting to a positive power only terminal 40, and the first silicon avalanche diode array connecting to a negative power only terminal 42, the second silicon avalanche diode array connecting to a positive communication only terminal 44, the second silicon avalanche diode array connecting to a negative communication only terminal 46, and a grounding terminal 16.

The transient surge protection unit 10 can include the first silicon avalanche diode array 18, which can be connected to the grounding terminal 16 and the positive power only terminal 40 and the second silicon avalanche diode array 20, which can be connected to the grounding terminal 16 and the negative power only terminal 42.

In this embodiment, the transient surge protection unit 10 can have a third silicon avalanche diode array 21, which can be connected to the grounding terminal 16 and the positive communication only terminal 44 and a fourth silicon avalanche diode array 23, which can be connected to the grounding terminal 16 and the negative communication only terminal 46.

In this embodiment, the programmable logic controller 50 with the common trouble alarm 52 can be connected to the first silicon avalanche diode array, the second silicon avalanche diode array, the third silicon avalanche diode array and the fourth silicon avalanche diode array with the unit viability wire 30 for indicating that the transient surge protection unit is operable or has self-sacrificed due to a power surge.

The water and impact resistant housing 22 can envelope the first silicon avalanche diode array, the second silicon avalanche diode array, the third silicon avalanche diode array, the fourth silicon avalanche diode array and the programmable logic controller 50.

The first non-polar wire 24 can be connected to the positive power only terminal 40, the second non-polar wire 26 can be connected to the negative power only terminal 42, a third non-polar wire 25 can be connected to the positive communication only terminal 44, a fourth non-polar wire 27 connected to the negative communication only terminal 46, and the grounding wire 28 connected to the grounding terminal 16.

In embodiments, a first dedicated loop of power 60 consists of the positive power only terminal 40 and the negative power only terminal 42 with the first silicon avalanche diode array 18 and the second silicon avalanche diode array 20. A second dedicated loop of communication 62 consists of the positive communication only terminal 44 and the negative communication only terminal 46 with the third silicon avalanche diode array 21 and the fourth silicon avalanche diode array 23. The grounding terminal 16 has a grounding wire 28 for providing excess energy to ground. The grounding terminal is connected simultaneously to both the first and second silicon avalanche diode arrays.

In this embodiment, the transient surge protection unit can provide multivariable power and communication protection for an RS 485 communication loop or an RS 232 communication loop for field instruments.

As an example of how to use the transient surge protection unit, which can simultaneously provide communication and power transient surge protection for field instrumentation and be configured for operating under multiple communication protocols with a nanosecond response time, the user can connect the first non-polar wire to the positive power and communication terminal of the transient surge protection unit and a positive terminal of a field instrument.

The user can connect the second non-polar wire to the negative power and communication terminal of the transient surge protection unit and a negative terminal of the field instrument.

The user can connect the grounding wire to the grounding terminal of the transient surge protection unit and a grounding terminal of the field instrument.

Then, the unit viability wire can be electrically connected to the programmable logic controller or to the common trouble alarm of a programmable logic controller to indicate that the transient surge protection unit is operable or has self-sacrificed due to a power surge.

Once the transient surge protection unit is connected to the field instrument, the first silicon avalanche diode array can turn on or off when overvoltage is detected.

Independently and simultaneously, the second silicon avalanche diode array can turn on or off when overvoltage is detected.

The transient surge protection unit can create the first dedicated loop of power 55 consisting of the positive power and communication terminal 12 with the first silicon avalanche diode array and a second dedicated loop of communication 57 consisting of the negative power and communication terminal 14 with the second silicon avalanche diode array to provide a non-degrading less than 5 nanosecond response time for transient surge protection from 4 milliamps to 20 milliamps of power and communication signals for the field instrument.

In an alternative example of how to use the transient surge protection unit, which can simultaneously provide communication and power transient surge protection system for field instrumentation with separate communication and power loops and operating under multiple communication protocols, a user can connect a first non-polar wire to the positive power terminal of the transient surge protection unit and a positive terminal of a field instrument.

The user can connect a second non-polar wire to the negative power terminal of the transient surge protection unit and a negative terminal of the field instrument.

The user can connect a third non-polar wire to the positive communication terminal of the transient surge protection unit to a positive communication terminal of the field instrument.

The user can connect a fourth non-polar wire to the negative communication terminal of the transient surge protection unit to a negative communication terminal of the field instrument.

The user can connect the grounding wire to the grounding terminal of the transient surge protection unit and a grounding terminal of the field instrument.

The unit viability wire can be electrically connected to the programmable logic controller or to the common trouble alarm of a programmable logic controller to indicate that the transient surge protection unit is operable or has self-sacrificed due to a power surge.

Once transient surge protection unit is connected to the field instrument, the first silicon avalanche diode array can turn on or off when overvoltage is detected.

Independently and simultaneously, the second silicon avalanche diode array can turn on or off when overvoltage is detected.

Independently and simultaneously, the third silicon avalanche diode array can turn on or off when overvoltage is detected.

Independently and simultaneously, the fourth silicon avalanche diode array can turn on or off when overvoltage is detected.

In embodiments, any number of silicon avalanche diode arrays can be used depending upon application of the embodiments.

The transient surge protection unit can create a first dedicated loop of power 55 consisting of the positive power terminal with the first silicon avalanche diode array and the negative power terminal with the second silicon avalanche diode array.

Simultaneously, a second dedicated loop of communication 57 can be created consisting of the positive communication terminal and the negative communication terminal with the third silicon avalanche diode array and the fourth silicon avalanche diode array.

The first and second dedicated loops can provide non-degrading less than 5 nanosecond response time to transient surge protection for field instruments.

The invention operates in the following sequence of steps in an embodiment, a combined power and communication signal comes into the first silicon avalanche diode array through multiple communication protocols as Step 100.

If excess energy is detected, the excess energy is diverted to ground as Step 102.

The energy exits the second silicon avalanche diode array with interruptible communication and power as Step 104.

Figure 3:
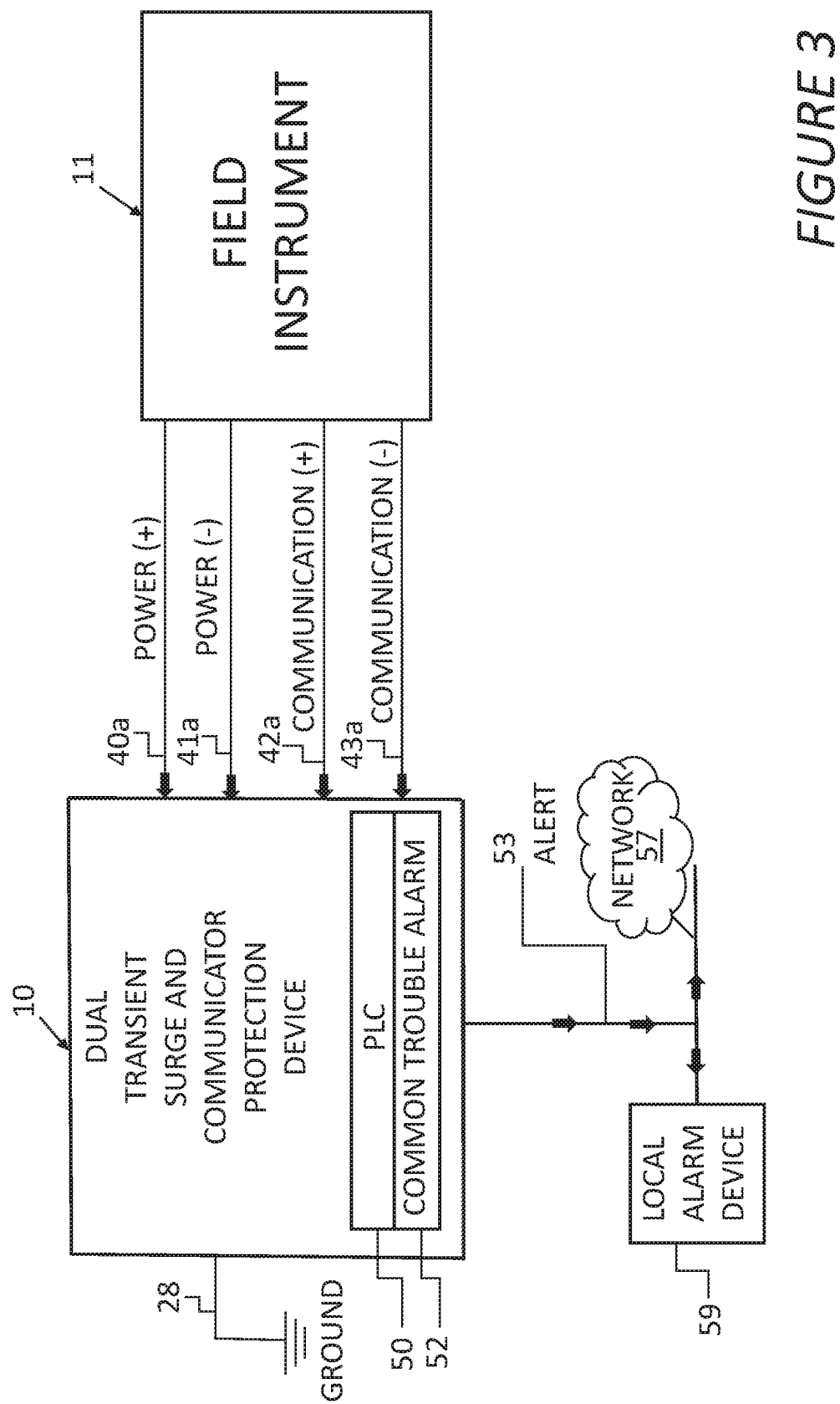
FIG. 3 is a diagram of a field instrument in electrical and communication with an embodiment of the dual transient surge and communication protection device for field instrumentation.

FIG. 3 is a diagram of a field instrument in electrical and communication with an embodiment of the dual transient surge and communication protection device for field instrumentation.

FIG. 3 shows a field instrument 11 connected to the dual transient surge and communication protection device 10.

FIG. 3 shows the dual transient surge and communication protection device having an internal programmable logic circuit 50 with a common trouble alarm 52.

A common wire 28 extends from the dual transient surge and communication protection device to ground.

FIG. 3 shows four inputs from the field instruments, positive (+) power 40, negative (−) power 41, positive communication signal (+) 42 and negative communication signal (−) 43.

The programmable logic circuit 50 the common trouble alarm activates, transmits an alarm 52 to a network 57 or to a local alarm device 59.

Figure 4:
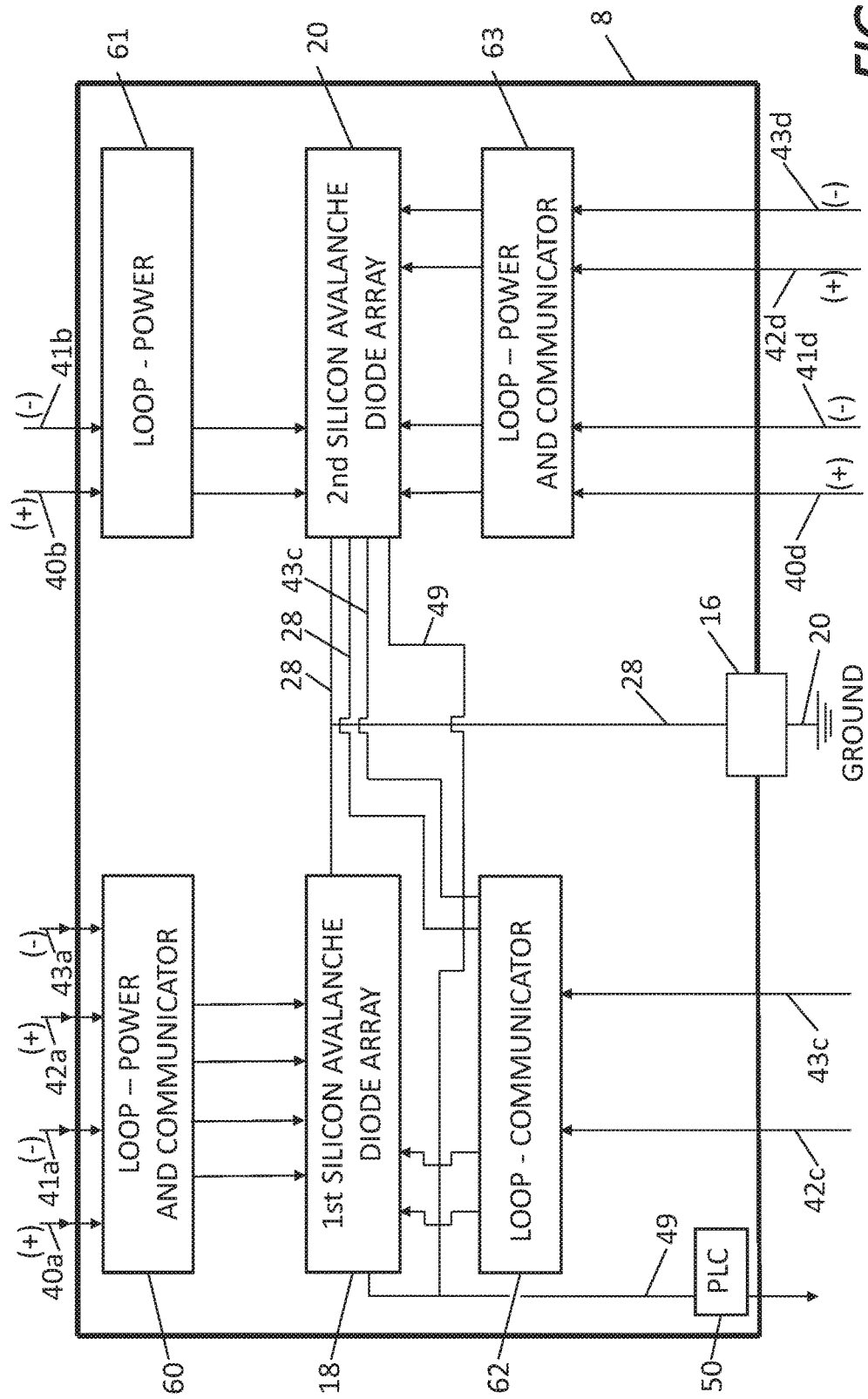
FIG. 4 is a diagram of the dual silicon avalanche diode arrays in communication with the multiple dedicated loops.

FIG. 4 is a diagram of the dual silicon avalanche diode arrays in communication with the multiple dedicated loops.

FIG. 4 shows four inputs from a field instrument to a dedicated power and communication loop 60.

FIG. 4 shows positive (+) power 40a, negative (−) power 41a, positive communication signal (+) 42a and negative communication signal (−) 43a.

The dedicated power and communication loop transmits to a first silicon avalanche diode array 18.

The first silicon avalanche diode array 18 connects to a dedicated communication loop 62 that receives positive communication signal (+) 42c and negative communication signal (−) 43c.

FIG. 4 shows the first silicon avalanche diode array in communication with the programmable logic circuit 50.

FIG. 4 shows two inputs from a field instrument to a dedicated power loop 61.

FIG. 4 shows positive (+) power 40b and negative (−) power 41b.

The dedicated power loop transmits to a second silicon avalanche diode array 20.

The second silicon avalanche diode array 20 connects to a dedicated communication and power loop 63 that receives positive (+) power 40d and negative (−) power 41d positive communication signal (+) 42d and negative communication signal (−) 43d from a field instrument.

The second silicon avalanche diode array 20 shares the common ground wire 28 that transmits excess energy to ground 70.

The second silicon avalanche diode array 20 communicates with the programmable logic circuit 50 as well.

In embodiments, the dual transient surge and communication protection device has a plurality of additional silicon avalanche diode arrays connected to the grounding terminal, each having at least one of: a dedicated loop of power and communication, a loop of power, and a loop of communication, in parallel with the first and second silicon avalanche diode arrays.

In embodiments, the silicon avalanche diode arrays are mounted to an epoxy coated glass epoxy circuit board.

In embodiments, the silicon avalanche diode arrays are stacked diode arrays.

The dual transient surge and communication protection device can have silicon avalanche diode arrays comprising a plurality of RoHS complaint silicon avalanche diodes.

In embodiments, the dual transient surge and communication protection device uses a power supply that is a 24V DC power supply.

In embodiments, one or more signal input terminals are electrically connected to a supply line of the power supply in the dual transient surge and communication protection device and one or more signal output terminals are electrically connected to a return line of the power supply. The field instrument is electrically connected in parallel to the dual transient surge and communication protection device.

In embodiments, a signal terminal is electrically connected to a supply line of the power supply, for the dual transient surge and communication protection device, and one signal terminal is electrically connected to a return line of the power supply. One signal terminal is electrically connected to a supply line of a RS-422/485, RS232, or 4-20 MA communication link, and one signal terminal is electrically connected to a return line of the RS-422/485, RS232, or 4-20 MA communication link. The field device is electrically connected to the power supply in parallel to the dual transient surge and communication protection device.

In embodiments, the dual transient surge and communication protection device can be mounted into an explosion proof housing.

While these embodiments have been described with emphasis on the embodiments, it should be understood that within the scope of the appended claims, the embodiments might be practiced other than as specifically described herein.

What is claimed is:

1. A dual transient surge and communication protection device for field instrumentation, comprising:
   a dedicated loop of power and communication connected in parallel with at least one of:
   a dedicated loop of power;
   a dedicated loop of communication; and
   another dedicated loop of power and communication;
   a first silicon avalanche diode array configured for receiving power and communication from the dedicated loop of power and communication using multiple communication protocols, the first silicon avalanche diode array configured for transferring excess energy to ground via a common wire within less than 5 nanoseconds, when energy exceeds a preset limit;

a second silicon avalanche diode array connected in parallel with the first silicon avalanche diode array for receiving at least one of:
the dedicated loop of power;
the dedicated loop of communication; and
the another dedicated loop of power and communication; using multiple communication protocols, wherein the second silicon avalanche diode array is configured for automatically transferring excess energy to the ground via the common wire when energy exceeds the preset limit; and a programmable logic controller configured to receive a sacrifice signal when at least one of the silicon avalanche diode arrays self-sacrifices producing a common trouble alarm and transmitting an alert to a network or local alarm system; wherein the dual transient surge and communication protection device provides an uninterrupted combined power and communication signal from 4 milliamps to 20 milliamps for field instruments.

2. The dual transient surge and communication protection device of claim 1, comprising a positive power and communication terminal; and a negative power and communication terminal; and a grounding terminal; and a first non-polar wire connected to the positive power and communication terminal and a second non-polar wire connected to the negative power and communication terminal; and a grounding wire connected to the grounding terminal.

3. The dual transient surge and communication protection device of claim 1 comprising a water and impact resistant housing enveloping the first silicon avalanche diode array, the second silicon avalanche diode array and the programmable logic controller.

4. The dual transient surge and communication protection device of claim 1, wherein the field instruments comprise at least one of: transmitters, flow meters, flow computers, gas detection equipment, moisture and density instrumentation, gas chromatographs, valve control equipment, fluid or gas level instrumentation, and pressure and sensor transducers.

5. The dual transient surge and communication protection device of claim 1 comprising a plurality of additional silicon avalanche diode arrays connected to the grounding terminal, each having at least one of: a dedicated loop of power and communication, a loop of power, and a loop of communication, in parallel with the first and second silicon avalanche diode arrays.

6. The dual transient surge and communication protection device of claim 1, wherein the silicon avalanche diode arrays are mounted to an epoxy coated glass epoxy circuit board.

7. The dual transient surge and communication protection device of claim 1, wherein the silicon avalanche diode arrays are stacked diode arrays.

8. The dual transient surge and communication protection device of claim 1, wherein each silicon avalanche diode arrays comprising a plurality of RoHS compliant silicon avalanche diodes.

9. The dual transient surge and communication protection device of claim 1, having a power supply that is a 24V DC power supply.

10. The dual transient surge and communication protection device of claim 1, wherein one or more signal input terminals are electrically connected to a supply line of the power supply, and one or more signal output terminals are electrically connected to a return line of the power supply, the electrical device is electrically connected in parallel to the surge protector after the surge protector.

11. The dual transient surge and communication protection device claim 10, wherein a first signal terminal is electrically connected to a supply line of the power supply, a second signal terminal is electrically connected to a return line of the power supply, a third signal terminal is electrically connected to a supply line of one of a RS-422/485, RS232, or 4-20 MA communication link, a fourth signal terminal is electrically connected to a return line of the RS-422/485, RS232, or 4-20 MA communication link, and wherein the field device is electrically connected to the power supply in parallel to the dual transient surge and communication protection device.

12. The dual transient surge and communication protection device of claim 1, wherein dual transient surge and communication protection device is mounted into an explosion proof housing.

* * * * *